(12) United States Patent
Collier

(10) Patent No.: US 6,516,623 B1
(45) Date of Patent: Feb. 11, 2003

(54) VEHICULAR HEAT PUMP SYSTEM AND MODULE THEREFOR

(75) Inventor: Samuel J. Collier, Danville, KY (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 10/140,457

(22) Filed: May 7, 2002

(51) Int. Cl.[7] .................................................. F25B 27/00
(52) U.S. Cl. ...................................... 62/238.7; 62/324.6
(58) Field of Search .......................... 62/238.7, 324.1, 62/324.6

(56) References Cited

U.S. PATENT DOCUMENTS

| | | | |
|---|---|---|---|
| 4,391,104 A | * 7/1983 | Wendschlag | 62/238.7 |
| 5,372,011 A | * 12/1994 | O'Neal | 62/238.7 |
| 5,410,889 A | * 5/1995 | Sjoholm et al. | 62/238.7 |
| 5,727,396 A | * 3/1998 | Boyd et al. | 62/238.7 |
| 5,901,563 A | * 5/1999 | Yarbrough et al. | 62/238.7 |
| 6,041,613 A | * 3/2000 | Morse et al. | 62/238.7 |
| 6,233,951 B1 | * 5/2001 | Cardill | 62/238.7 |
| 6,347,527 B1 | * 2/2002 | Bailey et al. | 62/238.7 |

* cited by examiner

Primary Examiner—William E. Tapolcai
Assistant Examiner—Mohammad M. Ali
(74) Attorney, Agent, or Firm—Wood, Phillips, Katz, Clark & Mortimer

(57) ABSTRACT

A heat pump system includes a compressor (14), first and second heat exchangers (10,12) and a module (20) hydraulically interposed between the compressor (14) and the first and second heat exchangers (10,12). The module includes a heat exchanger component (22,24) together with an accumulator (34), an expansion device (40) and a four-way valve (52) for controlling operation of the system.

15 Claims, 3 Drawing Sheets

# VEHICULAR HEAT PUMP SYSTEM AND MODULE THEREFOR

FIELD OF THE INVENTION

This invention relates to heat pump systems, particularly those intended for vehicular applications, and those utilizing a transcritical refrigerant such as $CO_2$; and to a module useful in such systems.

BACKGROUND OF THE INVENTION

Refrigeration systems, such as air conditioning systems, have long been employed in vehicles, where they are highly desirable in terms of conditioning the environment in which an operator and/or passengers are seated. Such systems are not, however, without at least one draw-back. By their very nature, the many components are interconnected by fittings of various sorts which occasionally develop leaks. Furthermore, because the compressors in such systems are typically driven by an internal combustion engine that provides propulsion for the vehicle, the compressor and the drive therefor cannot be hermetically sealed in a single housing as is the case with residential or commercial refrigeration systems. In particular, because rotary power must be directed to the compressor, and such rotary power is typically mechanically derived from the engine of the vehicle, it is impossible to seal both the compressor and the engine in a single housing meaning that the moving components of the compressor must be sealed because they receive their motive force from an external device, i.e., the vehicle engine. Needless to say, these seals are capable of developing leaks and, in fact, refrigerant leaks from vehicular air conditioning systems are believed to be a major source of environmentally unfriendly compounds which damage the earth's ozone layer.

To overcome this problem, the industry first discarded the refrigerant commonly known as R12 in favor a more environmentally friendly refrigerant known as R134a. Even more recently, attention has focused on providing the desired air conditioning with refrigeration systems utilizing transcritical refrigerants that are even more environmentally friendly as, for example, carbon dioxide or $CO_2$. $CO_2$ systems, for example, may be successfully utilized without concern for the net addition of environmentally harmful compounds to the atmosphere. The $CO_2$ to be used as a refrigerant is derived from the atmosphere by conventional means and utilized in such systems. Should such systems develop leaks, the $CO_2$ discharged simply returns to the atmosphere from which it was derived originally so there is no net gain in atmospheric $CO_2$ as a result of such leaks.

Notwithstanding, leaks in even $CO_2$ systems are highly undesirable because they necessitate periodic replenishment of the refrigerant used in the system. Replenishment is not without its costs in terms of both labor and material and consequently, it is desirable to minimize the leakage that occurs in such systems.

Furthermore, heat pump systems for use in both cooling and heating the interior of a vehicle provide some advantages. For example, they require only a single heat exchanger within the passenger compartment that is utilized for both heating and cooling whereas conventional systems require two such heat exchangers, one for evaporating a refrigerant to cool the passenger compartment and the other for rejecting heat to the passenger compartment from engine coolant. And, of course, both of these heat exchangers must be piped individually and provided with separate controls.

These additional components add to the cost of the vehicle and not infrequently add weight and bulk over and above that which would be present were a single heat exchanger and related piping to be employed for both heating and cooling. The additional weight adversely impacts on fuel economy making the vehicle more expensive to operate and requires the consumption of more fuel than would be the case if the weight of the vehicle could be reduced. This in turn can result in additional air pollutants being generated by engine operation which possibly could be reduced if the fuel economy could be improved. The additional bulk decreases the useful volume of the passenger compartment and typically makes servicing more difficult.

The present invention is directed to overcoming one or more of the above problems.

SUMMARY OF THE INVENTION

It is the principal object of the invention to provide a new and improved heat pump system. It is also an object of the invention to provide a module containing certain of the components of a heat pump system.

According to one facet of the invention, there is provided a heat pump system for use in a vehicle having a propulsion system that generates waste heat that is rejected to a coolant. The heat pump system includes a compressor, first and second heat exchangers with the first heat exchanger being adapted to be disposed in a passenger compartment or the like to alternatively reject or accept heat from the environment within the passenger compartment. The second heat exchanger is adapted to be disposed in a vehicle and located to be in an air stream that exists when the vehicle is in motion.

A module is hydraulically interposed between the compressor and the first and second heat exchangers. The module includes a base adapted to be mounted to a vehicle and an accumulator having an inlet and outlet is mounted on the base. A valving device is mounted on the base and includes an inlet fitting accessible from the exterior of the module connected to the high pressure side of the compressor. A valve outlet is connected to the accumulator inlet at a location within the module. A first inlet/outlet fitting accessible from the exterior of the module is connected from the valving device to the first heat exchanger and a second inlet/outlet fitting accessible from the exterior of the module is connected to the second heat exchanger. The valving device includes at least one valve member movable between positions to alternatively connect the inlet fitting to a selected one of the first and second inlet/outlet fittings and to alternatively connect the valve outlet to the other of the first and second inlet/outlet fittings. An expansion device is mounted on the base and has a first port provided with a fitting accessible from the exterior of the module and connected to the first heat exchanger. A heat exchanger component is also mounted on the base and has first and second heat exchange fluid flow paths. The first flow path is in heat exchange relation with the second flow path. The first flow path is connected to the accumulator outlet at a location within the module and also has an outlet fitting accessible from the exterior of the module and connected to a low pressure side of the compressor. The second flow path is connected to a second port on the expansion device at a location within the module and has an inlet/outlet fitting accessible exteriorly of the module and connected to the second heat exchanger. Transcritical refrigerant is in the heat pump system.

In a preferred embodiment, the valving device includes a single four-way valve.

In one embodiment, the heat pump system includes a closed housing having an interior space containing the base, the accumulator, the valving device, the expansion device and the heat exchanger component. The fittings are located on the exterior of the closed housing, and the accumulator inlet and outlet, the valve outlet and the expansion device second port are located within the closed housing interior space.

Even more preferably, the closed housing is insulated.

In a highly preferred embodiment of the invention, the heat exchanger component has first, second and third heat exchange fluid flow paths with the first flow path being in heat exchange relation with both the second and third flow paths. In this embodiment, the third flow path is adapted to be connected to a source of coolant.

In one embodiment, the heat exchanger component includes two separate heat exchangers within the module, both of the separate heat exchangers having a respective part of the first flow path and one of the separate heat exchangers has the second flow path and the other of the separate heat exchangers has the third flow path.

In another embodiment of the invention, the heat exchanger component comprises a single heat exchanger within the module having the first, second and third flow paths.

As alluded to previously, the invention also contemplates a module apart from the compressor, the first and second heat exchangers and the refrigerant within the system. The module is described in varying degrees of specificity above.

Other objects and advantages will become apparent from the following specification taken in connection with the accompanying drawings.

DESCRIPTION OF THE PREFERRED EMBODIMENT

Figure 1:
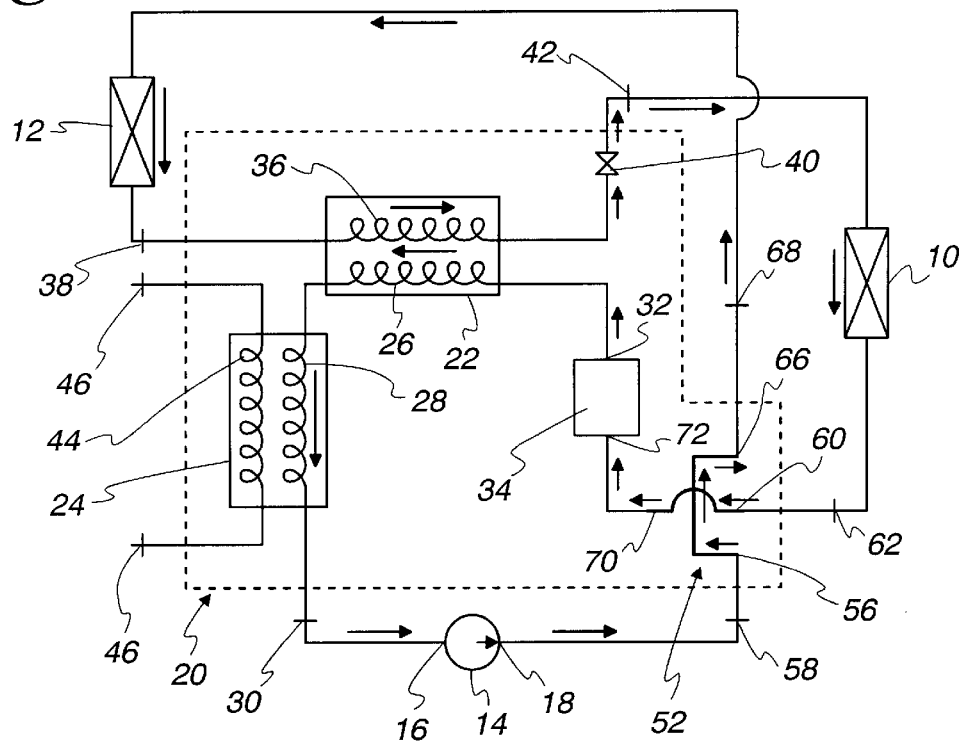
FIG. 1 is a schematic of a heat pump system made according to one embodiment of the invention and illustrating flow directions and component configurations when employed in a cooling mode of operation.

A heat pump system made according to the invention is ideally suited for use in vehicular applications for heating and cooling a passenger compartment or the like. Typically the vehicle will have a propulsion system that is cooled by a coolant. For example, when the propulsion system includes an internal combustion engine, engine coolant will be the coolant employed. Alternatively, if the vehicle is propelled by a fuel cell system, coolant employed to cool the fuel cells during operation may be utilized as the coolant. In all events, it is to be understood that the invention is not limited to use with internal combustion engine driven systems and may be employed with efficacy in nonvehicular applications where desired.

The invention will also be described in the environment of a system operating with a transcritical refrigerant as, for example, $CO_2$. However, the invention may also be employed in R134a and other like systems where a suction line heat exchanger is employed in the system. The invention also may be utilized with transcritical refrigerants other than $CO_2$.

With the foregoing in mind, reference will be made to FIGS. 1 and 2 which schematically illustrate the heat pump system of the invention. The same includes a heat exchanger 10 which is adapted to be disposed within the passenger compartment of a vehicle. Typically, a fan (not shown) will be operative to drive air through the heat exchanger 10 into the passenger compartment. Depending upon whether the heat pump system is in a cooling or a heating mode, the heat exchanger 10 will either accept heat from the air passing through it to cool the passenger compartment or reject heat into the air passing through it to heat the passenger compartment.

The system also includes a second heat exchanger 12 which preferably is configured as a conventional gas cooler utilized in transcritical refrigerant systems. The heat exchanger 12 will typically be located on the vehicle at some location where an air stream will pass through the same when the vehicle is in motion. An electrically driven or engine driven fan may also be utilized to assist or provide the flow of air through the heat exchanger 12.

The system also includes a refrigerant compressor 14 having a suction or low pressure side 16 and a high pressure side 18. The low pressure side 16 includes a port which acts as an inlet for refrigerant while the high pressure side 18 includes a port which acts as a discharge outlet for compressed refrigerant.

The first and second heat exchangers 10,12 and compressor 14 are interconnected hydraulically by a module, generally designated 20, containing other system components necessary for operation. In the embodiment illustrated in FIGS. 1 and 2, the module 20 includes a heat exchanger component including two separate heat exchangers 22 and 24, respectively. The heat exchanger 22 includes a first heat exchange fluid flow path 26 which is connected in series with a first fluid flow path 28 in the heat exchanger 24. The first fluid flow path 28 is connected to a fitting 30 that is located on the exterior of the module 20 to be accessible thereat and which is connected to the port associated with the low pressure side 16 of the compressor 14. The first fluid flow path 26 is also connected to the outlet port 32 of a conventional refrigerant accumulator bottle 34 located within the module 20. As illustrated, the connecting tubing is all contained within the module 20.

Also contained within the module 20, and specifically within the heat exchanger 22, is a second heat exchange fluid flow path 36 which is in heat exchange relation with the first fluid flow path 26. One side of the second fluid flow path 36 is connected via a fixture 38 on the exterior of the module 20 and accessible thereat to one side of the heat exchanger 12. The opposite end of the second fluid flow path 36 is connected to a conventional expansion device 40 located within the module 20. The expansion device 40 is connected via a fitting 42 located on the exterior of the module 20 and accessible thereat to one side of the first heat exchanger 10.

The heat exchanger 24 includes a third heat exchange fluid flow path 44 for a heat exchange fluid which is in heat exchange relation with the first fluid flow path 28. Opposite ends of the third fluid flow path 44 have fittings 46 on the exterior of the module 20 to be accessible thereat by which the third fluid flow path 44 may be connected into the cooling circuit of the vehicle propulsion system to receive coolant therefrom so that the coolant passes through the third fluid flow path 44.

In some instances, it may be desirable to dispense with the heat exchanger 24, in which case, the first fluid flow path 26 and the heat exchanger 22 will be connected to the fitting 30.

Figure 5:
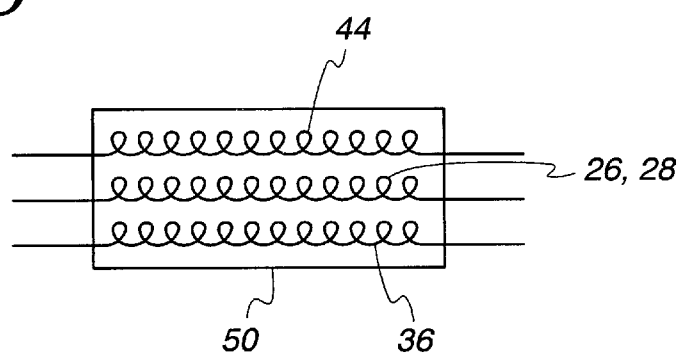
FIG. 5 illustrates a modified embodiment of a heat exchanger component employed within the module.

Further, and with reference to FIG. 5, in some instances, it may be desirable to combine the two separate heat exchangers 22,24 into a single heat exchange unit. Such a unit is shown schematically in FIG. 5 as a heat exchanger 50. The heat exchanger 50 has a first fluid flow path, again designated 26,28 which corresponds to the first fluid flow paths 26 and 28 in the heat exchangers 22 and 24, respectively. A second fluid path is designated 36 and is in heat exchange relation with the first fluid flow path 26,28 within the heat exchanger 50. The second fluid flow path 36 is connected into the system in the same fashion as the second fluid path within the heat exchanger 22.

The heat exchanger 50 further includes a third fluid flow path, also designated 44 corresponding to the third fluid flow path 44 within the heat exchanger 24. It is connected into the system in the same manner as the third fluid flow path 44 of the heat exchanger 24 and is in heat exchange relation with the first fluid flow path 26,28.

Returning to FIGS. 1 and 2, another component of the module 40 is a four-way valve, generally designated 52. As illustrated in FIGS. 1 and 2, the same can be in the form of a spool valve of conventional construction for a four-way valve. Alternatively, the same could be formed as a rotary four-way valve. As still a further alternative, two three-way valves could be employed to achieve the same function.

The four-way valve 52 includes an inlet 56 connected via a fixture 58 on the exterior of the module 20 and accessible thereat to the high pressure side 18 of the compressor 14. It also includes a first inlet/outlet 60 connected via a first inlet/outlet fixture 62 on the exterior of the module to be accessible thereat to the first heat exchanger 10.

The four-way valve 52 further includes a second inlet/outlet port 66 which is connected via a fixture 68 external to the module 20 to be accessible thereat to the heat exchanger 12.

Finally, the four-way valve 52 includes an outlet port 70 which is connected to an inlet port 72 of the accumulator 34, such connection being wholly within the module 20.

As can be appreciated from the foregoing description of the components, the system requires a large number of connections to provide the desired hydraulic circuit. However, as described, only eight fittings are required and are located externally of module 20 as these fittings are required to make external connections to the first and second heat exchangers 10,12, the compressor 14 and the coolant system of the vehicle. Of course, if the third fluid flow path within the heat exchanger component interior of the module 20 is omitted, two of these external fittings can be eliminated.

Undesirable leakage may occur at any of the connections, particularly those involving fittings such as those described previously because such fittings are intended to be nonpermanent connections allowing connection and disconnection for assembly, servicing or the like. They may be threaded connections, compression fittings or they may be simply quick connect/disconnect fittings but regardless of their particular construction, they are more prone to leakage than a permanent connection that might be formed as by soldering or brazing. Thus, the connections between the various components and the piping involved within the module 20 may be made of relatively permanent connections as, for example, brazed or soldered connections while the fittings as described above may be threaded connections, compression fittings, quick connect/disconnect fittings or those traditionally employed in connecting the conduits and components of HVAC systems to one another in a releasable fashion for servicing or to assist in assembly. The net result is, however, that leakage prone connections are minimized through the use of the module 20 and its relatively permanent interior connections, thereby avoiding leakage problems as mentioned previously.

As alluded to previously, FIG. 1 illustrates the configuration of system components when the system is in a cooling mode. In this embodiment, the four-way valve 52 is such as to connect the first inlet/outlet port 60 to the outlet port 70 while connecting the inlet port 56 to the second inlet/outlet port 66. In other words, in a cooling mode, the high pressure side 18 of the compressor 14 is connected to the second heat exchanger 12 via the four-way valve 52 while the first heat exchanger 10 is connected via the four-way valve 52 to the accumulator 34. Those skilled in the art will readily appreciate that in this mode, a first heat exchanger is acting as an evaporator while the second heat exchanger 12 is acting as a condenser or gas cooler. The heat exchanger 22 on the interior of the module 20 is acting as a suction line heat exchanger which is particularly advantageous when the refrigerant employed is a transcritical refrigerant such as $CO_2$. It may also be used to advantage in systems employing other refrigerants such as large R134a systems. The function of suction line heat exchangers is well known and will not be discussed here.

In the cooling mode, the heat exchanger 24 performs no particular function and coolant flow through the third fluid flow path 44 thereof may be halted by means of a suitably controlled valve, if desired.

Figure 2:
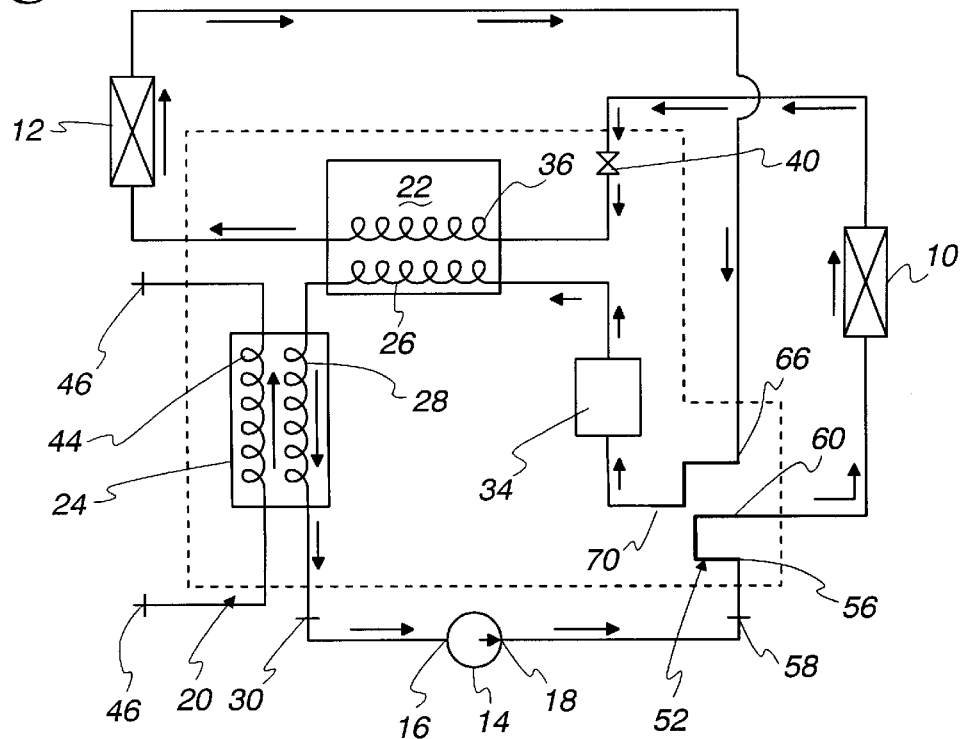
FIG. 2 is a schematic similar to FIG. 1 but illustrating the system flow and component configurations while in a heating operation.

The configuration of components and flow directions of the system when operating in a heating mode are illustrated in FIG. 2. In this case, the four-way valve 52 connects the high pressure side 18 of the compressor 14 to the first heat exchanger 10 which is now acting as a condenser or gas cooler thereby rejecting heat into the passenger compartment in which it is located. At the same time, return flow from the heat exchanger 10 is passed through the expansion valve 40 to the flow through the second fluid flow path 36 within the heat exchanger 22 to the second heat exchanger 12 which is acting as an evaporator. From the second heat exchanger 12, the refrigerant will pass to the port 66 of the four-way valve 52 to be discharged through the outlet 70 to the accumulator 34, from which it will ultimately be returned via the first fluid flow path 26,28 to the low pressure side 16 of the compressor 14. At this time, a hot coolant from the vehicle propulsion system will be flowing through the third fluid flow path 44 within the heat exchanger 24 and will reject heat to the refrigerant flowing through the first fluid flow path 26,28. This assures that all refrigerant passing to the low pressure side 16 of the compressor 14 will be in vapor form so as to avoid damage to the compressor 14. In some instances, particularly at low ambient temperatures, the coolant flowing through the third flow path 44 is caused to reject sufficient heat to the refrigerant which is then passed by the compressor 14 at an increased temperature which is then passed to the first heat exchanger 10 to increase the quantity of heat that may be rejected by the same into the passenger compartment.

Figure 3:
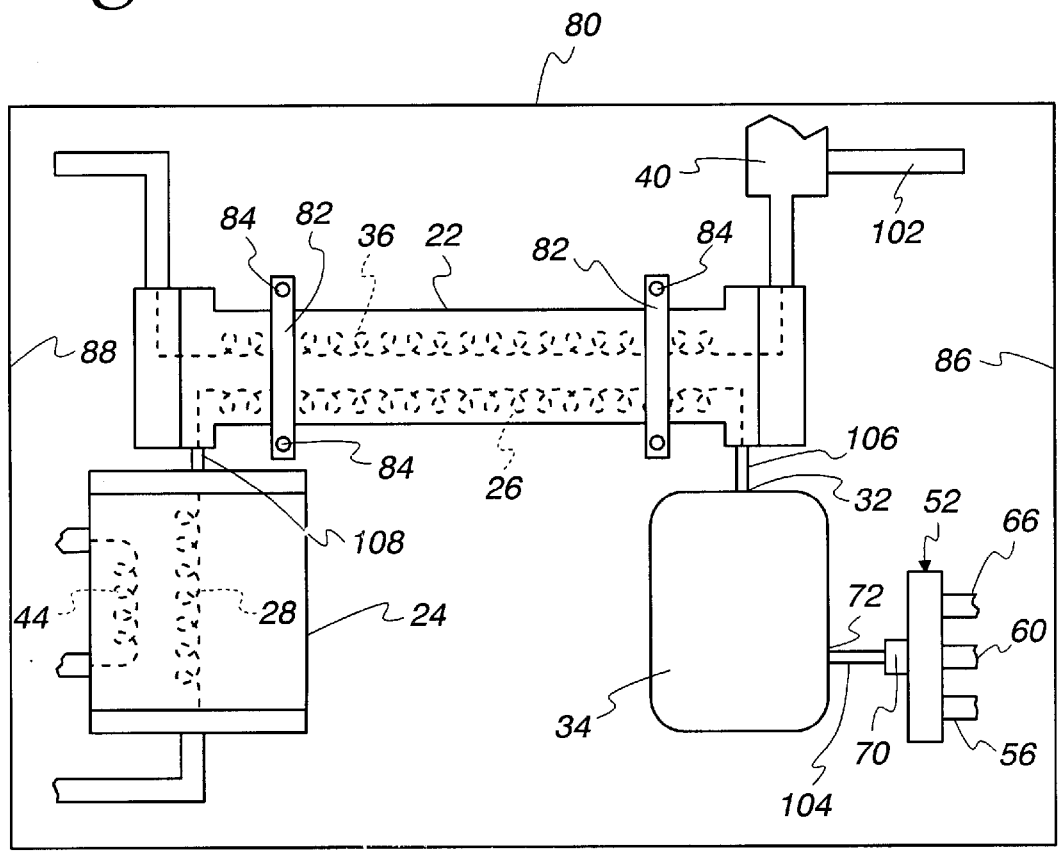
FIG. 3 is a side elevation of a base employed in a module made according to the invention.
Figure 4:
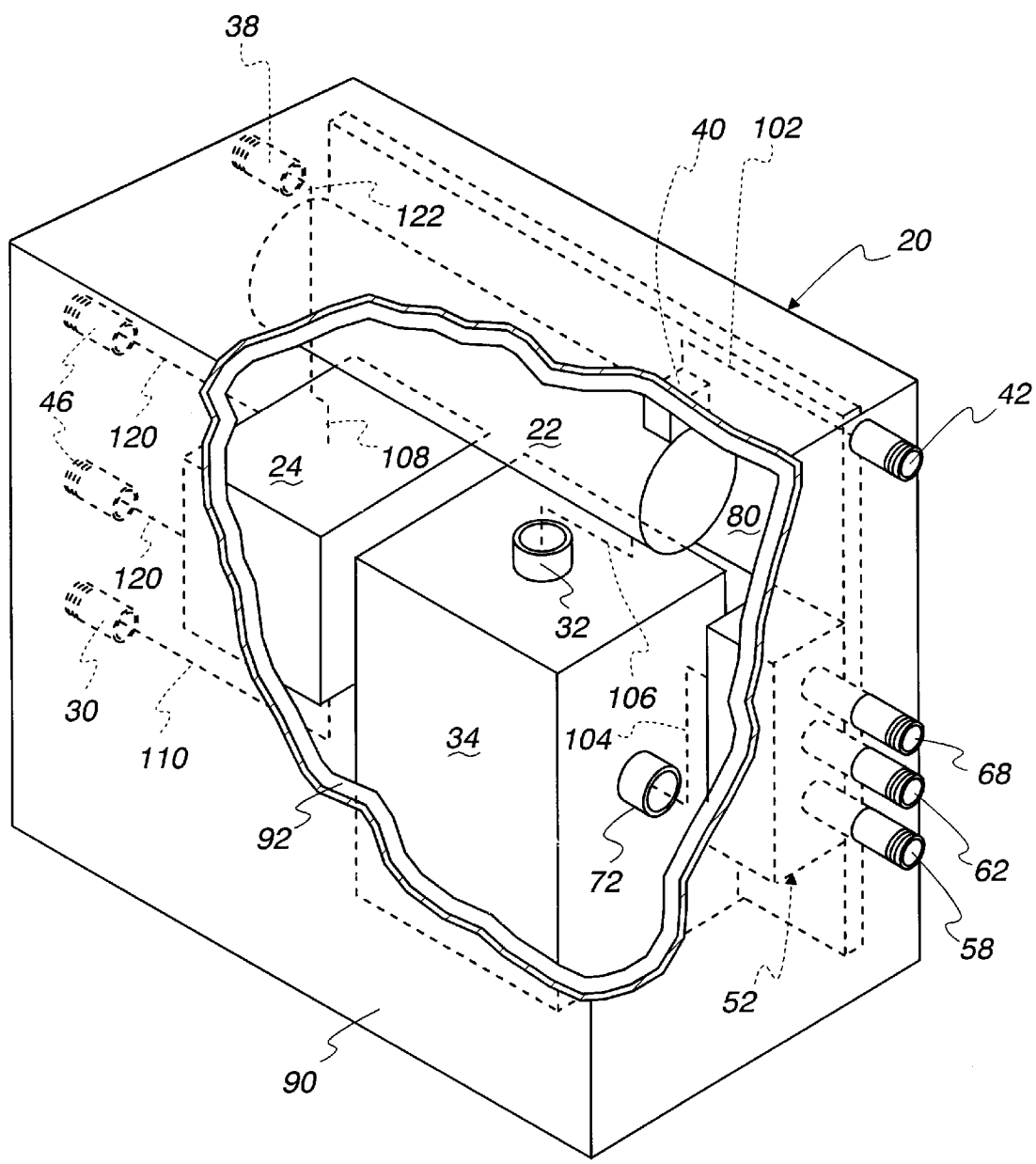
FIG. 4 is a perspective view of the module with parts broken away for clarity.

Turning now to FIGS. 3 and 4, one embodiment of the physical construction of the module 20 is illustrated. Referring first to FIG. 3, a base plate 80 is employed to mount the various components. For example, FIG. 3 illustrates the heat exchanger 22 mounted to the base plate 80 by straps 82 and threaded fasteners 84. Similar straps and threaded fasteners (not shown) may be employed to mount the other components as well.

Though not illustrated in FIG. 3, various lines are shown as directed toward the right side 86 of the plate 80, specifically, a line from the expansion device 40 and lines from the four-way valve ports 56,60,66 which terminate in the fittings that are located on and accessible at the exterior of the module 20. Similarly, the lines from the third fluid flow path of the heat exchanger 24 and one from the first fluid flow path 28 of the heat exchanger 24 together with a line from the second fluid flow path 36 of the heat exchanger 22 extend toward the left side 88 of the plate 80. These lines all extend to the exterior of the module 20 as shown in FIG. 4 so that the fittings in which they terminate are accessible thereat.

Specifically, shown in FIG. 4, on the exterior of a housing 90, shown in the form of a rectangular solid and having an interior insulating layer 92, are the fittings 58,62,68, respectively that are accessible at the exterior of the housing 90 and which are connected respectively to the inlet 56 and the first and second inlet/outlets 60,66 of the four-way valve 52.

Also illustrated on the right-hand side of FIG. 4 is the fitting 42 on the exterior of the housing 90 and accessible thereat which is connected via an internal line 102 to the expansion device 40 within the housing 90.

An interior line 104 is shown schematically in FIG. 4 and connects the outlet 70 (not shown in FIG. 4) to the inlet 72 of the accumulator 34. This is an essentially permanent connection to avoid leakage at either the connection of the line 104 to the accumulator 34 of the connection of the line 104 to the outlet 70 of the four-way valve 52.

The outlet 32 of the accumulator 34 is connected by a line shown schematically at 106 to the heat exchanger 22. This connection is likewise on the interior of the housing 90 and will be of the generally permanent type.

Also shown in FIG. 4 is the connection via a line 108 which is shown only schematically that extends between the heat exchanger 22 and the heat exchanger 24 to connect the first flow paths in each to one another as illustrated in FIG. 3. Similarly, a line shown schematically at 110 is connected to the heat exchanger 24 within the housing 90 and extends to the fitting 30 which is on the exterior of the housing 90 and accessible thereat. Lines shown schematically at 120 connect the ends of the third fluid flow path 44 within the heat exchanger 24 to the fittings 46 which are on the exterior of the housing 90 and accessible thereat.

Finally, a line shown schematically at 122 extends from the heat exchanger 22 to the fitting 38 on the exterior of the housing 90 for ultimate connection to the second heat exchanger 12 (FIGS. 1 and 2). The line 122 is connected to one end of the second fluid flow path 36 within the heat exchanger 22.

The various fittings 30, 38, 42, 46, 58, 62 and 68 are shown only schematically in FIGS. 1 and 2 and as threaded ends on tubes in FIG. 4. However, as noted previously, these fittings may be compression fittings, quick connect/disconnect fittings or any fittings conventionally employed in making releasable connections between conduits in HVAC systems.

The module just described dwells mainly on the reduction of leak prone connections in a refrigeration system. However, the module is readily adapted to include a number of additional value enhancing components. For example, the invention contemplates that an electronic circuit board that provides control logic for the system compressor as well as the expansion valve 40 can readily be placed within the module housing. Similarly, temperature and pressure sensors can be located within the module in appropriate ones of the flow lines therein and be provided with electrical connections to the exterior of the module housing to obtain power for the system and to connect to the compressor as well as provide control signals for the various modes of operation and for engine operation when employed in a vehicular system.

In a like vein, pressure relief valves can be included within the module for either high or low pressure or both. Such valves could be as simple as a rupturable pressure disk that could be easily replaced once it has been ruptured or a self-resetting pressure relief valve.

The module could also be provided with a charge port that would allow for addition of refrigerant to the system when the refrigerant charge is, for any reason, insufficient for proper system operation. Furthermore, a variable flow control valve and electric actuator therefore may be incorporated in the module in the liquid coolant line at a location between the fittings 46 (FIGS. 1 and 2) and at a location within the module housing to regulate flow of coolant to the heat exchanger 24.

To the extent that such components require connection in to the flow lines, the connections may be made of a relatively permanent nature and tested at the time of manufacture of the module to assure that they are leak free and thus in keeping with the desire of the invention to reduce leak prone connections.

It will therefore be appreciated that the number of leak prone connections in a heat pump system is vastly reduced through the use of a module such as the module 20. Consequently, problems associated with leakage, whether as a result of the discharge of environmentally unfriendly refrigerants, or simply the cost of servicing, including replenishment of refrigerant, are minimized through use of the invention. Furthermore, the invention provides a means of assuring that refrigerant in partially liquid form cannot reach the low pressure side 16 of the compressor 14 to possibly cause damage thereto while at the same time provides for the addition of heat to the refrigerant when the heat pump system is operating in the heating mode to assure adequate heat is delivered to the passenger compartment even under low ambient temperature conditions.

What is claimed is:

1. A heat pump system for use in a vehicle having a propulsion system that generates waste heat that is rejected to a coolant and comprising:

a compressor;

first and second heat exchangers, said first heat exchanger being adapted to be disposed in a passenger compartment or the like to alternatively reject or accept heat from the environment within a passenger compartment or the like, said second heat exchanger being adapted to be disposed in a vehicle and located to be in an air stream that exists when the vehicle is in motion;

a module hydraulically interposed between said compressor and said first and second heat exchangers, said module including a base adapted to be mounted to a vehicle, a refrigerant accumulator having an inlet and an outlet and mounted on said base, a valving device mounted on said base and including an inlet fitting accessible from the exterior of the module and connected to a high pressure side of said compressor, a valve outlet connected to said accumulator inlet at a location within said module, a first inlet/outlet fitting accessible from the exterior of the module and connected to said first heat exchanger, a second inlet/outlet fitting accessible from the exterior of the module and connected to said second heat exchanger, and at least one valve member movable between positions to alternatively connect said inlet fitting to a selected one of said first and second inlet/outlet fittings and to alternatively connect said valve outlet to the other of said first and second inlet/outlet fittings, an expansion device mounted on said base and having a first port providing with a fitting accessible from the exterior of the module and connected to said first heat exchanger, a heat exchanger component mounted on said base and having a first, second and third heat exchange fluid flow paths, at least said first flow path being in heat exchange relation with both said second and third flow paths, said first flow path being connected to said accumulator outlet at a location within said module and having an outlet fitting accessible from the exterior of the module and connected to a low pressure side of said compressor, said second flow path being connected to a second port on said expansion device at a location within said module and having an inlet/outlet fitting accessible exteriorly of said module connected to said second heat exchanger, and said third flow path having an inlet fixture accessible exteriorly of said module and adapted to receive coolant and an outlet fixture accessible exteriorly of said module adapted to discharge coolant; and a transcritical refrigerant in said heat pump system.

2. The heat pump system of claim 1 wherein said heat exchanger component includes two separate heat exchangers within said module, both of said separate heat exchangers having a respective part of said first flow path, one of said separate heat exchangers having said second flow path and the other of said separate heat exchangers having said third flow path.

3. The heat pump system of claim 1 wherein said heat exchanger component comprises a single heat exchanger within said module and having said first, second and third flow paths.

4. The heat pump system of claim 1 wherein said valving device comprises a single 4-way valve.

5. The heat pump system of claim 1 wherein said module includes a closed housing having an interior space containing said base, said accumulator, said valving device, said expansion device and said heat exchanger component, said fittings are located on the exterior of said closed housing and said accumulator inlet and outlet, said valve outlet and said expansion device second port are located within said closed housing interior space.

6. The heat pump system of claim 5 wherein said closed housing is insulated.

7. A heat pump system for use in a vehicle having a propulsion system that generates waste heat that is rejected to a coolant and comprising:

a compressor;

first and second heat exchangers, said first heat exchanger being adapted to be disposed in a passenger compartment or the like to alternatively reject or accept heat from the environment within a passenger compartment or the like, said second heat exchanger being adapted to be disposed in a vehicle and located to be in an air stream that exists when the vehicle is in motion;

a module hydraulically interposed between said compressor and said first and second heat exchangers, said module including a base adapted to be mounted to a vehicle, a refrigerant accumulator having an inlet and an outlet and mounted on said base, a valving device mounted on said base and including an inlet fitting accessible from the exterior of the module connected to a high pressure side of said compressor, a valve outlet connected to said accumulator inlet at a location within said module, a first inlet/outlet fitting accessible from the exterior of the module and connected to said first heat exchanger, a second inlet/outlet fitting accessible from the exterior of the module and connected to said second heat exchanger, and at least one valve member movable between positions to alternatively connect said inlet fitting to a selected one of said first and second inlet/outlet fittings and to alternatively connect said valve outlet to the other of said first and second inlet/outlet fittings, an expansion device mounted on said base and having a first port providing with a fitting accessible from the exterior of the module and connected to said first heat exchanger, a heat exchanger component mounted on said base and having first and second heat exchange fluid flow paths, said first flow path being in heat exchange relation with said second flow path, said first flow path being connected to said accumulator outlet at a location within said module and having an outlet fitting accessible from the exterior of the module and connected to a low pressure side of said compressor, said second flow path being connected to a second port on said expansion device at a location within said module and having an inlet/outlet fitting accessible exteriorly of said module connected to said second heat exchanger; and a transcritical refrigerant in said heat pump system.

8. The heat pump system of claim 7 wherein said valving device comprises a single 4-way valve.

9. The heat pump system of claim 7 wherein said module includes a closed housing having an interior space containing said base, said accumulator, said valving device, said expansion device and said heat exchanger component, said fittings are located on the exterior of said closed housing and said accumulator inlet and outlet, said valve outlet and said expansion device second port are located within said closed housing interior space.

10. The heat pump system of claim 9 wherein said closed housing is insulated.

11. For use in a heat pump system for a vehicle having a propulsion system that generates waste heat that is rejected to a coolant and which includes a compressor, and first and second heat exchangers, the first heat exchanger being adapted to be disposed in a passenger compartment or the like to alternatively reject or accept heat from the environment within a passenger compartment or the like, the second heat exchanger being adapted to be disposed in a vehicle and located to be in an air stream that exists when the vehicle is in motion, a module adapted to be hydraulically interposed between the compressor and the first and second heat exchangers, said module including a base adapted to be mounted to a vehicle, a refrigerant accumulator having an inlet and an outlet and mounted on said base, a valving device mounted on said base and including an inlet fitting accessible from the exterior of the module and adapted to be connected to a high pressure side of said compressor, a valve connected to said accumulator inlet at a location within said module, a first inlet/outlet fitting accessible from the exterior of the module and adapted to be connected to the first heat exchanger, a second inlet/outlet fitting accessible from the exterior of the module and adapted to be connected to the second heat exchanger, and at least one valve member movable between positions to alternatively connect said inlet fitting to a selected one of said first and second inlet/outlet fittings and to alternatively connect said valve outlet to the other of said first and second inlet/outlet fittings, an expansion device mounted on said base and having a first port providing with a fitting accessible from the exterior of the module and adapted to be connected to the first heat exchanger, a heat exchanger component mounted on said base and having first, second and third heat exchange fluid flow paths, at least said first flow path being in heat exchange relation with both said second and third flow paths, said first flow path being connected to said accumulator outlet at a location within said module and having an outlet fitting accessible from the exterior of the module adapted to be connected to a low pressure side of said compressor, said second flow path being connected to a second port on said expansion device at a location within said module and having an inlet/outlet fitting accessible exteriorly of said module adapted to be connected to the second heat exchanger, and said third flow path having an inlet fixture accessible exteriorly of said module and adapted to receive coolant and an outlet fixture accessible exteriorly of said module adapted to discharge coolant.

12. For use in a heat pump system for use in a vehicle having a propulsion system that generates waste heat that is rejected to a coolant and which includes a compressor, first and second heat exchangers, the first heat exchanger being adapted to be disposed in a passenger compartment or the like to alternatively reject or accept heat from the environment within a passenger compartment or the like, the second heat exchanger being adapted to be disposed in a vehicle and located to be in an air stream that exists when the vehicle is in motion, a module hydraulically interposed between said compressor and said first and second heat exchangers, said module including a base adapted to be mounted to a vehicle, a refrigerant accumulator having an inlet and an outlet and mounted on said base, a valving device mounted on said base and including an inlet fitting accessible from the exterior of the module and adapted to be connected to a high pressure side of said compressor, a valve outlet connected to said accumulator inlet at a location within said module, a first inlet/outlet fitting accessible from the exterior of the module and adapted to be connected to the first heat exchanger, a second inlet/outlet fitting accessible from the exterior of the module and adapted to be connected to said second heat exchanger, and at least one valve member movable between positions to alternatively connect said inlet fitting to a selected one of said first and second inlet/outlet fittings and to alternatively connect said valve outlet to the other of said first and second inlet/outlet fittings, an expansion device mounted on said base and having a first port providing with a fitting accessible from the exterior of the module and adapted to be connected to said first heat exchanger, a heat exchanger component mounted on said base and having first and second heat exchange fluid flow paths, said first flow path being in heat exchange relation with said second flow path, said first flow path being connected to said accumulator outlet at a location within said module and having an outlet fitting accessible from the exterior of the module and adapted to be connected to a low pressure side of said compressor, said second flow path being connected to a second port on said expansion device at a location within said module and having an inlet/outlet fitting accessible exteriorly of said module and adapted to be connected to the second heat exchanger.

13. The heat pump system of claim 12 wherein said valving device comprises a single 4-way valve.

14. The heat pump system of claim 12 wherein said module includes a closed housing having an interior space containing said base, said accumulator, said valving device, said expansion device and said heat exchanger component, said fittings are located on the exterior of said closed housing and said accumulator inlet and outlet, said valve outlet and said expansion device second port are located within said closed housing interior space.

15. The heat pump system of claim 14 wherein said closed housing is insulated.

* * * * *